United States Patent
Yang et al.

(10) Patent No.: US 11,619,516 B2
(45) Date of Patent: Apr. 4, 2023

(54) METHOD FOR DETECTING MAP ERROR INFORMATION, APPARATUS, DEVICE, VEHICLE AND STORAGE MEDIUM

(71) Applicant: APOLLO INTELLIGENT DRIVING TECHNOLOGY (BEIJING) CO., LTD., Beijing (CN)

(72) Inventors: Fan Yang, Beijing (CN); Xiaoxing Zhu, Beijing (CN); Zhijie Wang, Beijing (CN); Shiyu Song, Sunnyvale, CA (US)

(73) Assignee: APOLLO INTELLIGENT DRIVING TECHNOLOGY (BEIJING) CO., LTD.

(*) Notice: Subject to any disclaimer, the term of this patent is extended or adjusted under 35 U.S.C. 154(b) by 98 days.

(21) Appl. No.: 16/708,503

(22) Filed: Dec. 10, 2019

(65) Prior Publication Data

US 2020/0182631 A1 Jun. 11, 2020

(30) Foreign Application Priority Data

Dec. 10, 2018 (CN) .......................... 201811502462.8

(51) Int. Cl.
*G01C 21/00* (2006.01)
*G05D 1/02* (2020.01)
(Continued)

(52) U.S. Cl.
CPC ..... *G01C 21/3859* (2020.08); *G01C 21/3492* (2013.01); *G01C 21/3848* (2020.08);
(Continued)

(58) Field of Classification Search
CPC . G01C 21/32; G01C 21/3492; G06F 16/2379; G06F 16/29; G05D 1/0214;
(Continued)

(56) References Cited

U.S. PATENT DOCUMENTS 6,560,529 B1 * 5/2003 Janssen ............ G08G 1/096725
340/988
9,063,548 B1 * 6/2015 Ferguson .............. B60W 30/12
(Continued)

FOREIGN PATENT DOCUMENTS

CN      101517365 A      8/2009
CN      106525057 A      3/2017
CN      106996793 A      8/2017

OTHER PUBLICATIONS

First Office Action issued in CN Patent Application No. 201811502462.8 dated Jun. 19, 2020.
(Continued)

*Primary Examiner* — Maceeh Anwari
*Assistant Examiner* — Charles Pall
(74) *Attorney, Agent, or Firm* — Dilworth IP, LLC (57) ABSTRACT

The present application provides a method for detecting map error information, an apparatus, a device, a vehicle and a storage medium, where the method includes: acquiring current environmental feature information around a vehicle; and detecting, according to the current environmental feature information and map data, whether the map data is erroneous. Whether the map data is erroneous is detected in real time based on the current environmental feature information during the process of the actual traveling of the vehicle, which improves timeliness and efficiency for the map error detection, thereby the map data can be corrected in time and the traveling safety of the vehicle may be improved.

16 Claims, 4 Drawing Sheets

(51) Int. Cl.
  *G01C 21/34* (2006.01)
  *G06F 16/29* (2019.01)
  *G06F 16/23* (2019.01)
  *G06V 10/98* (2022.01)
  *G06V 20/56* (2022.01)
  *G06K 9/62* (2022.01)
  *H04L 67/12* (2022.01)

(52) U.S. Cl.
  CPC ......... *G05D 1/0214* (2013.01); *G05D 1/0223* (2013.01); *G05D 1/0285* (2013.01); *G06F 16/2379* (2019.01); *G06F 16/29* (2019.01); *G06V 10/993* (2022.01); *G06V 20/588* (2022.01); *H04L 67/12* (2013.01); *G05D 2201/0212* (2013.01); *G06K 9/629* (2013.01)

(58) Field of Classification Search
  CPC ............... G05D 1/0223; G05D 1/0285; G05D 2201/0212; G06K 9/00798; G06K 9/036; G06K 9/629; H04L 67/12
  See application file for complete search history.

(56) References Cited

U.S. PATENT DOCUMENTS

| | | | |
|---|---|---|---|
| 2010/0103040 A1* | 4/2010 | Broadbent | G01S 19/48 342/357.28 |
| 2010/0324797 A1* | 12/2010 | Fritz | B60W 10/06 701/1 |
| 2017/0291615 A1* | 10/2017 | Kusano | G07C 5/0825 |
| 2019/0137287 A1* | 5/2019 | Pazhayampallil | G05D 1/0291 |
| 2019/0325349 A1* | 10/2019 | Zhang | G06N 5/046 |
| 2020/0309538 A1* | 10/2020 | Gonsa | G08G 1/0112 |

OTHER PUBLICATIONS

Increase Computation Speed, Google, Industrial Patent Analysis Report, vol. 58, Chapter 6, Analysist of Important Applicants for Decision Control Technology, Jun. 1, 2017, pp. 142-144.
Rejection Decision in CN Patent Application No. 201811502462.8 dated May 7, 2021.

* cited by examiner

METHOD FOR DETECTING MAP ERROR INFORMATION, APPARATUS, DEVICE, VEHICLE AND STORAGE MEDIUM

CROSS-REFERENCE TO RELATED APPLICATION

This application claims priority to Chinese Patent Application No. 201811502462.8, filed on Dec. 10, 2018, which is hereby incorporated by reference in its entirety.

TECHNICAL FIELD

The present application relates to the field of the automatic driving technology, and in particular, to a method for detecting map error information, an apparatus, a device, a vehicle and a storage medium.

BACKGROUND

With the rapid development of science and technology, the autonomous driving technology gradually attracts people's attention and becomes a current hotspot. The implementation of autonomous driving depends on a high-precision map for navigation. However, a real scenario may change over time, resulting in that some of interesting points in the high precision map may be outdated or wrong relative to the real scenario, so it is necessary to correct the high-precision map.

In the prior art, the map data is generally corrected by periodically collecting feature information of the real scenario. In this way, the map data cannot be corrected in time, which is likely to cause a safety risk for the traveling of the autonomous vehicle.

SUMMARY

The present application provides a method for detecting map error information, an apparatus, a device, a vehicle and a storage medium, so as to solve the defects such as low efficiency for detecting map error information in the prior art.

A first aspect of the present application provides a method for detecting map error information, including:

acquiring current environmental feature information around a vehicle;

detecting, according to the current environmental feature information and map data, whether the map data is erroneous.

A second aspect of the present application provides an apparatus for detecting map error information, including:

an acquiring module, configured to acquire current environmental feature information around a vehicle;

a processing module, configured to detect, according to the current environmental feature information and map data, whether the map data is erroneous.

A third aspect of the present application provides a computer device, comprising: at least one processor and a memory;

the memory stores a computer program, and the at least one processor executes the computer program stored in the memory to implement the method according to the first aspect.

A fourth aspect of the present application provides a vehicle, comprising: at least one sensor and an apparatus according to the second aspect.

A fifth aspect of the present application provides a computer readable storage medium having a computer program stored thereon, where when the computer program is executed, the method according to the first aspect is implemented.

According to the method for detecting map error information, the apparatus, the device, the vehicle and the storage medium provided by the present application, whether the map data is erroneous is detected in real time based on the current environmental feature information during the process of the actual traveling of the vehicle, which improves timeliness and efficiency for the map error detection, thereby the map data can be corrected in time and the traveling safety of the vehicle may be improved.

BRIEF DESCRIPTION OF THE DRAWINGS

In order to more clearly illustrate technical solutions in embodiments of the present application or the prior art, accompanying drawings required for describing the embodiments or the prior art will be briefly described below. Obviously, the accompanying drawings in the following description are some of the embodiments of the present application, and other drawings can be obtained by those skilled in the art based on these accompanying drawings without any creative effort.

Explicitly illustrated embodiments of the present application have been shown through the above-mentioned drawings and will be described in further detail below. These drawings and the written description are not intended to limit the scope of the present disclosure in any way, but rather to illustrate the concept of the present application for those skilled in in the art by referring to specific embodiments.

DESCRIPTION OF EMBODIMENTS

In order to make the purpose, technical solutions and advantages of embodiments of the present application more clear, the technical solutions in the embodiments of the present application are clearly and completely described in the following with reference to accompanying drawings in the embodiments of the present application. Obviously, the described embodiments are some, instead of all, of the embodiments of the present application. Based on the embodiments in the present application, all other embodiments obtained by those skilled in the art without any creative effort are within the scope of the present application.

Figure 1:
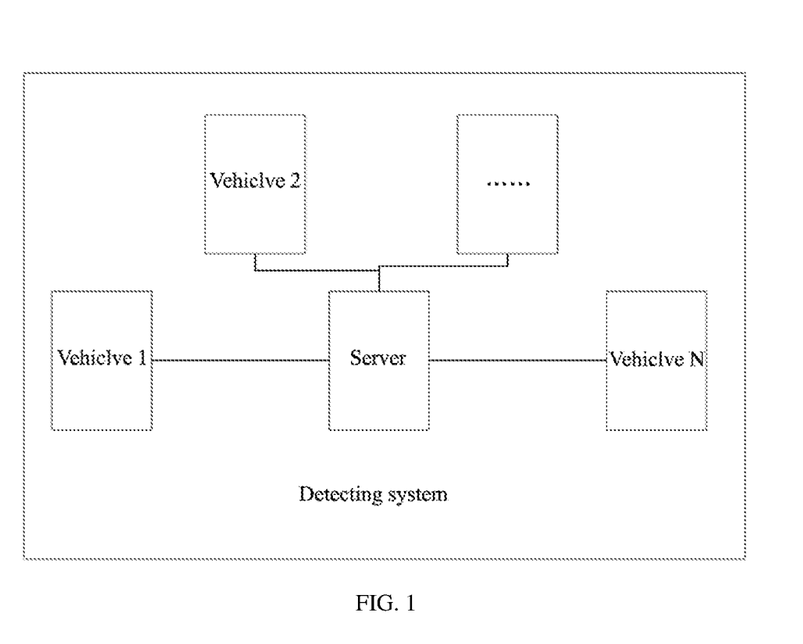
FIG. 1 is a schematic structural diagram of a detecting system that is applicable to an embodiment of the present application.

A method for detecting map error information according to the embodiments of the present application is applicable to real-time detection of a map data error in actual traveling of an autonomous vehicle, so that detection efficiency of map error information is improved, the map data is corrected in time, and safety for subsequent traveling of the vehicle is improved. FIG. 1 is a schematic structural diagram of a detecting system which is applicable to the embodiments of the present application. The detecting system includes a server and at least one vehicle. Each vehicle detects a map data error in real time during a process of actual traveling, and reports error information to the server, so that the server corrects the map data.

In addition, terms "first", "second" and the like are merely used for the purpose of illustration and are not to be construed as indicating or implying a relative importance or implicitly indicating the number of technical features indicated. In the description of following various embodiments, "multiple" means more than two unless specifically defined otherwise.

The following specific embodiments may be combined with each other, and the same or similar concepts or processes may not be repeated in some embodiments. The embodiments of the present disclosure will be described below with reference to the drawings.

Embodiment I

This embodiment provides a method for detecting map error information, which is used for detecting a map error in real time. An execution body of the present embodiment is an apparatus for detecting map error information, which may be disposed in a computer device that is disposed on the vehicle.

Figure 2:
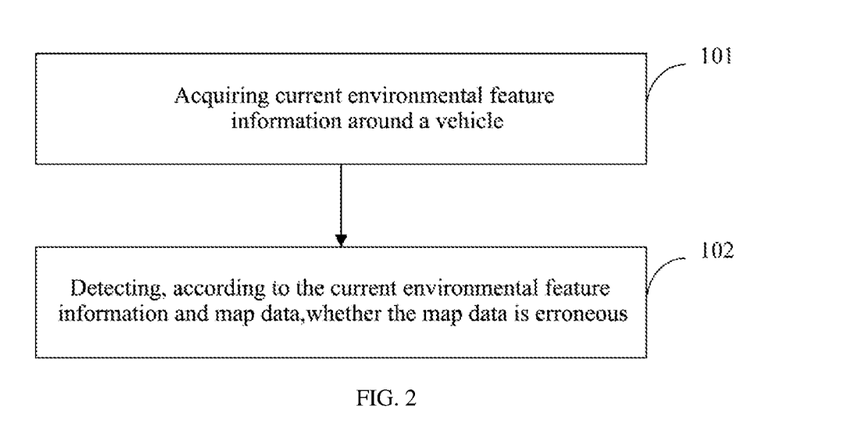
FIG. 2 is a schematic flowchart of a method for detecting map error information according to an embodiment of the present application.

FIG. 2 is a schematic flowchart of a method for detecting map error information according to this embodiment, where the method includes:

Step 101: acquiring current environmental feature information around a vehicle.

Specifically, the vehicle is provided with sensors such as a camera (for example, a binocular camera, a monocular camera), radar, laser radar, millimeter wave radar, etc., and the vehicle can acquire current environmental feature information around the vehicle in real time during a process of actual traveling of the vehicle.

The current environmental feature information may include lane line feature information, intersection feature information, lane quantity feature information, roadside object feature information, etc.

The lane feature information may include lane line position information, a quantity of lane lines at different positions of a road ahead, etc. The intersection feature information may include intersection position information, what kind of intersection it is, what buildings are there in an impassable direction of the intersection, traffic light information at the intersection, etc. The lane quantity feature information may include a quantity of lanes corresponding to an impassable position ahead. The roadside object feature information may include various objects appearing at roadside, such as a building, a sign, a telegraph pole. The above are only examples for illustration, and the environmental feature information may also include other feature information, which may be specially set according to actual needs and will not be limited in this embodiment.

Optionally, the current environmental feature information may be acquired by processing the detection information of the sensors, and the specific processing manner may be any practical manner in the prior art. For example, acquiring the lane line position, lane quantities in different roads, the position of roadside buildings, etc. through laser radar and camera in combination with GPS positioning or point cloud visual positioning.

The vehicle may be an automatic vehicle, or may be a semi-automatic vehicle or a smart vehicle that is equipped with corresponding sensors, which is not limited to the automatic vehicle as long as the vehicle can acquire the surrounding environmental feature information.

Step 102: detecting, according to the current environmental feature information and map data, whether the map data is erroneous.

Specifically, after the current environmental feature information around the vehicle is acquired, the current environmental feature information may be compared with the map data, and whether a mark in the map data is erroneous is determined through the comparison.

The map data may be high-precision map data.

For example, the vehicle detects that there is a telegraph pole at a certain position on the roadside, but the telegraph pole is not shown on the map, which may indicate that the mark in the map data is erroneous.

Optionally, after an error is detected, relevant information of the telegraph pole may be reported to a server, so that the server adds mark data about the telegraph pole to the map data, thereby the map data can be supplemented.

For example, if the vehicle detects that the number of the lanes ahead is 3, and the number is compared with the map data, it is found that there are 4 lanes being marked in the map data, which may indicate that the mark in the map data is erroneous.

Optionally, related error information may be reported to the server, so that the server corrects the map data according to the error information. An alarm may also be given to warn passengers on the vehicle. Corresponding safety measures may also be taken, such as controlling the vehicle to slow down, stop, pull over, etc.

For example, if the vehicle detects that the road ahead is impassable and a row of fences are provided there, but it is marked in the map data that it is a passable road, then it is indicated that the mark of the map is erroneous. Optionally, the vehicle may be controlled to stop, and the detected error information may be reported to the server for correction of the map data.

Optionally, based on a comparison result between the current environmental feature information and the map data, confidence levels of different lanes in the current environment may be determined, and a fault tolerance measure is taken based on different confidence levels, for example, a lane with a high confidence level is selected to continuous travelling.

After the map data error is detected, what specific measure is performed may be selected according to different situations, which is not limited in the present embodiment.

In the method for detecting map error information according to this embodiment, whether the map data is erroneous is detected in real time based on the current environmental feature information during the process of the actual traveling of the vehicle, which improves timeliness and efficiency for the map error detection, thereby the map data can be corrected in time and the traveling safety of the vehicle may be improved.

Embodiment II

The present embodiment further supplements the method provided in Embodiment I.

Figure 3:
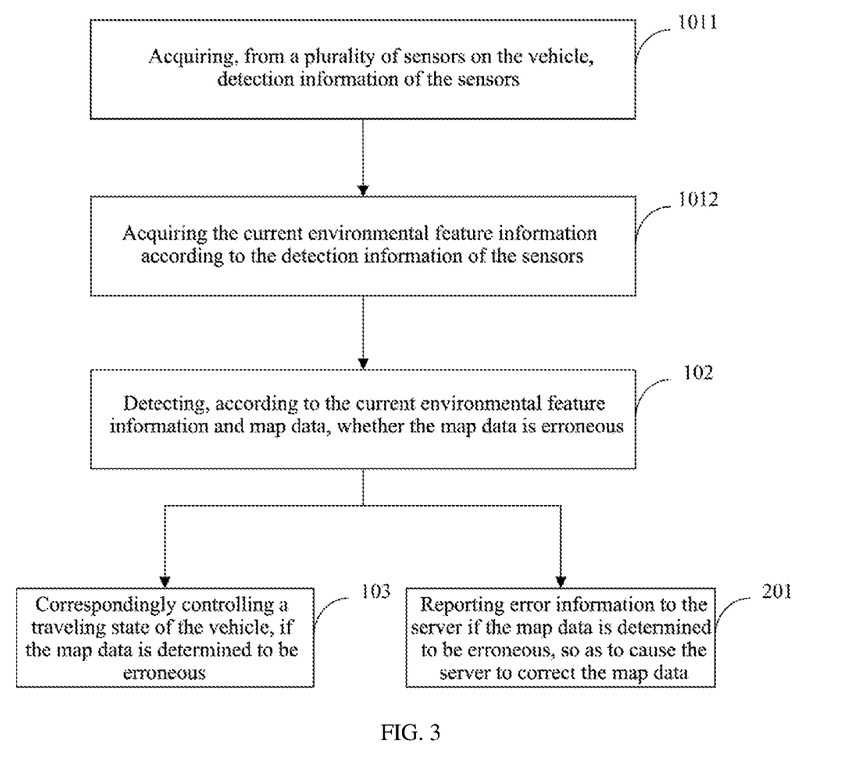
FIG. 3 is a schematic flowchart of a method for detecting map error information according to another embodiment of the present application.

FIG. 3 is a schematic flowchart of a method for detecting map error information according to this embodiment.

As an implementable manner, on the basis of the preceding Embodiment I, optionally, step 101 specifically includes:

Step 1011: acquiring, from a plurality of sensors on the vehicle, detection information of the sensors.

Step 1012: acquiring the current environmental feature information according to the detection information of the sensors.

Specifically, the sensor may include sensors such as a camera (for example, a binocular camera, a monocular camera, etc.), radar, laser radar, millimeter wave radar.

For example, each sensor respectively collects environmental information in different directions around the vehicle, and partial or complete surrounding environmental feature information may be acquired through technologies such as image recognition, point cloud visual positioning, GPS positioning, and point cloud fusion, etc., and the environmental feature information may be compared with the map data.

As another implementable manner, on the basis of the preceding Embodiment I, optionally, after step 102, the method may further include:

Step 103: correspondingly controlling a traveling state of the vehicle, if the map data is determined to be erroneous.

Specifically, when the map data mark is found to erroneous, in order to avoid risk for continued traveling, the vehicle may be controlled to slow down, stop, etc., so that the safety is ensured.

Optionally, the vehicle may be stopped only when the map mark of the road ahead is erroneous. If the error merely occurs in a mark of a certain position on the roadside, the traveling of the vehicle would not be affected, and the vehicle may continue traveling and report the error information.

Optionally, the step 103 may further include:

Step 1031: acquiring a lane confidence level of a current road according to the current environmental feature information and the map data, if it is determined that the map data is erroneous.

Step 1032: determining a target lane according to the lane confidence level of the current road.

Step 1033: controlling the vehicle to continue traveling along the target lane at a speed corresponding to a target lane confidence level.

Specifically, when it is determined that the road ahead is inconsistent with the map data, the lane confidence level of the current road may be acquired according to the current environmental feature information and the map data. For example, there are actually 3 lanes in the road ahead, and 4 lanes are marked on the map, then according to a comparison between the position information of the lanes and the position information of the lanes in the map data, the confidence level of a lane that is consistent with the map data is high, and the confidence level of a lane that is inconsistent with the map data is low. The target lane is selected according to different confidence levels, and the speed of the vehicle is controlled, where different speeds may be set for different confidence levels. The vehicle is controlled to continue traveling along the target lane at the speed corresponding to the target lane confidence level. For example, the vehicle may be controlled to travel slowly at a relatively low speed.

Optionally, when the vehicle travels on the target lane, a consistency situation between the road ahead and the map data during the process of traveling may be detected in real time. When a certain position is reached, and it is detected that the road ahead is consistent with the map data mark, the vehicle may resume normal traveling.

Figure 4:
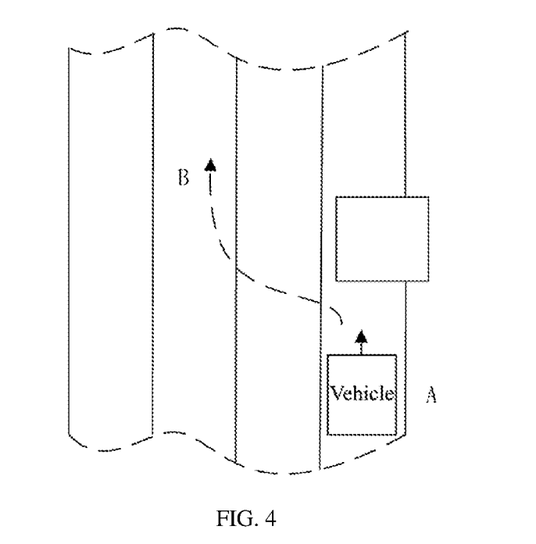
FIG. 4 is a schematic diagram of a process of traveling of a vehicle according to an embodiment of the present application.

For example, FIG. 4 is a schematic diagram of a process of traveling of a vehicle according to this embodiment. When the vehicle reaches point A, it is detected that the road ahead has 3 lanes, and there are 4 lanes marked in the map. Actually, there may be one lane under repair, and the vehicle may select one of the three lanes on the left side and travel slowly. When the vehicle reaches point B, it is found that the road ahead has 4 lanes, which is consistent with the map data, and then a normal traveling state can be resumed.

As another implementable manner, on the basis of the preceding Embodiment I, optionally, the method may further include:

Step 201: reporting error information to the server if the map data is determined to be erroneous, so as to cause the server to correct the map data.

For example, the vehicle detects that there is a telegraph pole at a certain position on the roadside and the telegraph pole is not shown on the map, it may indicate that the mark in the map data is erroneous, and relevant information about the telegraph pole may be reported to the server, so as to cause the server to add mark data about the telegraph pole in map data to supplement the map data.

For example, if the vehicle detects that the number of the lanes ahead is 3, and the number is compared with the map data, it is found that there are 4 lanes being marked in the map data, which may indicate that the mark in the map data is erroneous, and relevant error information may be reported to the server, so as to cause the server to correct the map data based on the error information.

For example, if the vehicle detects that the road ahead is impassable and a row of fences are provided there, but it is marked in the map data that it is a passable road, then it is indicated that the mark of the map is erroneous, and the detected error information may be reported to the server for correction of the map data.

As another implementable manner, on the basis of the preceding Embodiment I, optionally, the method may further include:

Step 202: giving alarm information, if the map data is determined to be erroneous.

Specifically, when the map data is found to be erroneous, the alarm information may be given through a display screen, a voice broadcast device, etc. on the vehicle. The alarm information may be displayed or broadcasted to warn passengers on the vehicle, for example, to suggest the passenger on the vehicle taking over the driving.

Optionally, the alarm may be given only in a situation where the inconsistency between the road ahead of the vehicle and the map, etc. will cause risk for the traveling, and the alarm may not be given in a situation that will not affect the traveling of the vehicle, for example, there is one additional object on the roadside, which may be specifically set according to actual needs, and will not be limited in this embodiment.

In some embodiments, the environmental feature information includes at least one of lane line feature information, intersection feature information, lane quantity feature information, and roadside object feature information.

The lane feature information may include lane line position information, a quantity of lane lines at different positions of a road ahead, etc. The intersection feature information may include intersection position information, what kind of intersection it is, what buildings are there in an impassable direction of the intersection, traffic light information at the intersection, etc. The lane quantity feature information may include a quantity of lanes corresponding to an impassable position ahead. The roadside object feature information may include various objects appearing at roadside, such as a building, a sign, a telegraph pole. The above are only examples for illustration, and the environmental feature information may also include other feature information, which may be specially set according to actual needs.

It should be noted that various implementable manners in this embodiment can be implemented separately, or may be combined in any combination manner without conflict, which is not limited in this embodiment.

In the method for detecting map error information according to this embodiment, whether the map data is erroneous is detected in real time based on the current environmental feature information during the process of the actual traveling of the vehicle, which improves timeliness and efficiency for the map error detection, thereby the map data can be corrected in time and the traveling safety of the vehicle may be improved. In addition, the vehicle detects the object that is not marked in the map data, so that the map data can be supplemented to make the map data more accurate. The fault tolerance measures are taken when it is found that the road ahead is inconsistent with the map data, thereby improving flexibility for controlling the vehicle.

Embodiment III

This embodiment provides an apparatus for detecting map error information, which is configured to implement the method of the Embodiment I.

Figure 5:
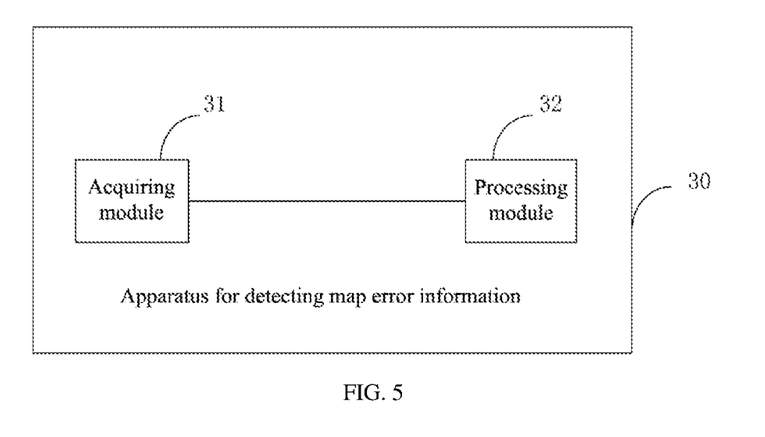
FIG. 5 is a schematic structural diagram of an apparatus for detecting map error information according to an embodiment of the present application.

FIG. 5 is a schematic structural diagram of an apparatus for detecting map error information according to the present embodiment. The apparatus for detecting map error information 30 includes an acquiring module 31 and a processing module 32.

The acquiring module 31 is configured to acquire current environmental feature information around a vehicle. The processing module 32 is configured to detect whether the map data is erroneous according to the current environmental feature information and map data.

For the apparatus in this embodiment, the specific manner in which each module performs the operations has been described in detail in the embodiment relating to the method, which will not be repeated herein.

According to the apparatus for detecting map error information according to this embodiment, whether the map data is erroneous is detected in real time based on the current environmental feature information during the process of the actual traveling of the vehicle, which improves timeliness and efficiency for the map error detection, thereby the map data can be corrected in time and the traveling safety of the vehicle may be improved.

Embodiment IV

This embodiment further supplements the apparatus for detecting map error information according to Embodiment III, so as to perform the method of Embodiment II.

As an implementable manner, on the basis of the preceding Embodiment III, optionally, the acquiring module is specifically configured to:

acquire, from a plurality of sensors on the vehicle, detection information of the sensors;

acquire the current environmental feature information according to the detection information of the sensors.

As another implementable manner, on the basis of the preceding Embodiment III, optionally, the processing module is further configured to:

correspondingly control a traveling state of the vehicle, if the map data is determined to be erroneous.

Optionally, the processing module is specifically configured to:

acquire a lane confidence level of a current road according to the current environmental feature information and the map data;

determine a target lane according to the lane confidence level of the current road;

control the vehicle to continue traveling along the target lane at a speed corresponding to a target lane confidence level.

Optionally, the processing module is further configured to:

detect a consistency between a road ahead and the map data in real-time;

control the vehicle to resume a normal traveling state, after it is detected that the road ahead is consistent with the map data.

As another implementable manner, on the basis of the preceding Embodiment III, optionally, the processing module is further configured to:

report error information to the server if the map data is determined to be erroneous, so as to cause the server to correct the map data.

As another implementable manner, on the basis of the preceding Embodiment III, optionally, the processing module is further configured to:

give alarm information, if the map data is determined to be erroneous.

As another implementable manner, on the basis of the preceding Embodiment III, optionally, the environmental feature information includes at least one of lane line feature information, intersection feature information, lane quantity feature information, and roadside object feature information.

For the apparatus in this embodiment, the specific manner in which each module performs the operations has been described in detail in the embodiment relating to the method, which will not be repeated herein.

It should be noted that various implementable embodiments in the present embodiment may be implemented separately, or may be combined in any combination manner without conflict, which is not limited in this embodiment.

According to the apparatus for detecting map error information according to this embodiment, whether the map data is erroneous is detected in real time based on the current environmental feature information during the process of the actual traveling of the vehicle, which improves timeliness and efficiency for the map error detection, thereby the map data can be corrected in time and the traveling safety of the vehicle may be improved. In addition, the vehicle detects the object that is not marked in the map data, so that the map data can be supplemented to make the map data more accurate. The fault tolerance measures are taken when it is found that the road ahead is inconsistent with the map data, thereby improving flexibility for controlling the vehicle.

Embodiment V

The present embodiment provides a computer device, which is configured to perform the methods for detecting map error information according to the preceding embodiments.

Figure 6:
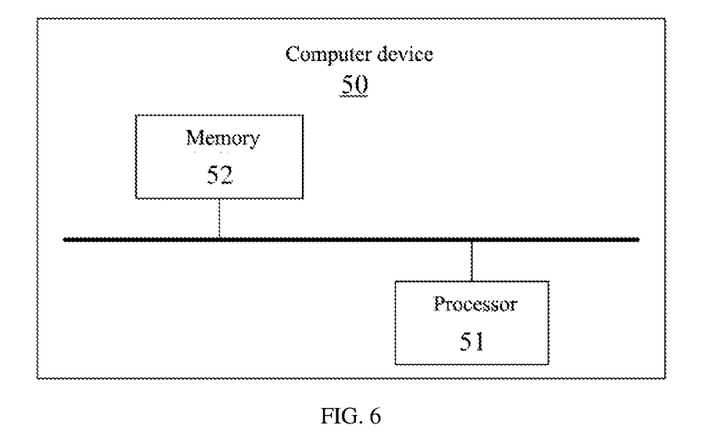
FIG. 6 is a schematic structural diagram of a computer device according to an embodiment of the present application.

FIG. 6 is a schematic structural diagram of a computer device according to this embodiment. The computer device 50 includes: at least one processor 51 and a memory 52.

The memory stores a computer program, and the at least one processor executes the computer program stored in the memory to implement the methods according to the above embodiments.

According to the computer device according to this embodiment, whether the map data is erroneous is detected in real time based on the current environmental feature information during the process of the actual traveling of the vehicle, which improves timeliness and efficiency for the map error detection, thereby the map data can be corrected in time and the traveling safety of the vehicle may be improved. In addition, the vehicle detects the object that is not marked in the map data, so that the map data can be supplemented to make the map data more accurate. The fault tolerance measures are taken when it is found that the road ahead is inconsistent with the map data, thereby improving flexibility for controlling the vehicle.

Embodiment VI

This embodiment provides a vehicle, which is configured to perform the methods according to the above embodiments.

Figure 7:
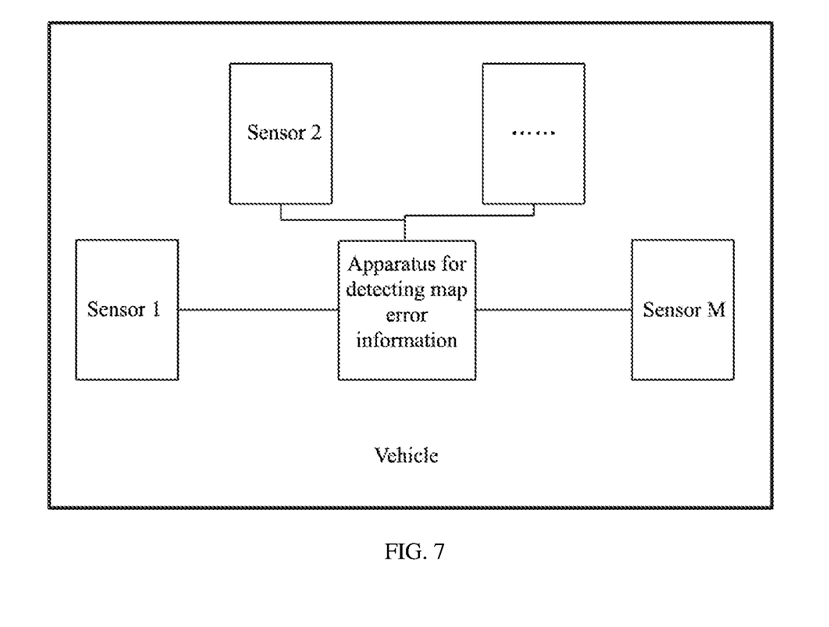
FIG. 7 is a schematic structural diagram of a vehicle according to an embodiment of the present application.

FIG. 7 is a schematic structural view of a vehicle according to the present embodiment. The vehicle includes: at least one sensor, and the apparatus according to any one of the above embodiments. The sensors may be different types of sensors, such as a camera, a binocular camera, a monocular camera, radar, laser radar, millimeter wave radar.

According to the vehicle according to this embodiment, whether the map data is erroneous is detected in real time based on the current environmental feature information during the process of the actual traveling of the vehicle, which improves timeliness and efficiency for the map error detection, thereby the map data can be corrected in time and the traveling safety of the vehicle may be improved. In addition, the vehicle detects the object that is not marked in the map data, so that the map data can be supplemented to make the map data more accurate. The fault tolerance measures are taken when it is found that the road ahead is inconsistent with the map data, thereby improving flexibility for controlling the vehicle.

Embodiment VII

This embodiment provides a computer readable storage medium having a computer program stored thereon, and when the computer program is executed, the method according to any one of the above embodiments is implemented.

According to the computer readable storage medium according to this embodiment, whether the map data is erroneous is detected in real time based on the current environmental feature information during the process of the actual traveling of the vehicle, which improves timeliness and efficiency for the map error detection, thereby the map data can be corrected in time and the traveling safety of the vehicle may be improved. In addition, the vehicle detects the object that is not marked in the map data, so that the map data can be supplemented to make the map data more accurate. The fault tolerance measures are taken when it is found that the road ahead is inconsistent with the map data, thereby improving flexibility for controlling the vehicle.

In the embodiments according to the present application, it should be understood that the disclosed apparatuses and methods may be implemented in other manners. For example, the apparatus embodiments described above are merely illustrative. For example, the division of the unit is only a division of logical functions. In actual implementations, there may be another division manner, for example, multiple units or components may be combined or integrated into another system, or some features can be omitted or not executed. In addition, the mutual coupling or direct coupling or communication connection shown or discussed may be an indirect coupling or communication connection through some interfaces, devices or units, and may be in an electrical, a mechanical or other form.

The units described as separate components may or may not be physically separated, and the components illustrated as units may or may not be physical units, that is, may be located in one place, or may be distributed to multiple network units. Some or all of the units may be selected according to actual needs to achieve the purpose of the solutions of the embodiment.

In addition, various functional units in various embodiments of the present application may be integrated into one processing unit, or various units may exist physically separately, or two or more units may be integrated into one unit. The above integrated units may be implemented in the form of hardware or in the form of hardware and software functional units.

The above-described integrated unit implemented in the form of a software functional unit can be stored in a computer readable storage medium. The above software functional unit is stored in a storage medium and includes several instructions to cause a computer device (which may be a personal computer, a server, or a network device, etc.) or a processor to perform some of the steps of the methods of the various embodiments of the present application. The above-mentioned storage medium includes: a U disk, a mobile hard disk, a read-only memory (ROM), a random access memory (RAM), a magnetic disk, or an optical disk, etc., which can store program codes.

A person skilled in the art can clearly understand that for the convenience and brevity of the description, the division of each functional module described above is only for exemplifying. In practical applications, the above functions may be assigned to be implemented by different functional modules as needed, that is, the internal structure of the apparatus is divided into different functional modules to perform all or part of the functions described above. For the specific working processes of the apparatuses described above, reference can be made to the corresponding processes in the foregoing method embodiments, which will not be repeated herein.

Finally, it should be noted that the above embodiments are merely for illustrating, instead of limiting, the technical solutions of the present application. Although the present application has been illustrated in detail with reference to the above embodiments, a person ordinarily skilled in the art should understand the technical solutions described in the above embodiments may be modified or equivalently substituted for some or all of the technical features, and the modifications and substitutions should do not cause the essence of the corresponding technical solutions depart from the scope of the technical solutions of the embodiments of the present application.

What is claimed is:

1. A method for detecting map error information, comprising:

acquiring, by a vehicle, current environmental feature information around the vehicle, wherein the current environmental feature information comprises at least one of lane line feature information, intersection feature information, lane quantity feature information, and roadside object feature information;
detecting, by the vehicle, according to the current environmental feature information and map data, whether the map data is erroneous;
determining whether a map data error affects traveling of the vehicle if the map data is determined to be erroneous, and correspondingly controlling a traveling state of the vehicle if the map data error affects the traveling of the vehicle;
wherein the correspondingly controlling a traveling state of the vehicle comprises:
acquiring lane confidence levels of various lanes of a current road, according to the current environmental feature information and the map data, wherein a lane confidence level of each lane represents a degree of consistency between detected position information of the lane and position formation of the lane in the map data;
determining, from the lanes of the current road, a lane having a highest lane confidence level as a target lane; and
controlling the vehicle to continue traveling along the target lane at a speed corresponding to the lane confidence level of the target lane,
wherein different speeds are set for different lane confidence levels.

2. The method according to claim 1, wherein the acquiring current environmental feature information around a vehicle comprises:
acquiring, from a plurality of sensors on the vehicle, detection information of the sensors;
acquiring the current environmental feature information according to the detection information of the sensors.

3. The method according to claim 1, wherein after the controlling the vehicle to continue traveling along the target lane at a speed corresponding to the lane confidence level of the target lane, the method further comprises:
detecting a consistency between a road ahead and the map data in real-time;
controlling the vehicle to resume a normal traveling state, when it is detected that the road ahead is consistent with the map data.

4. The method according to claim 1, wherein the method further comprises:
reporting error information to a server if the map data is determined to be erroneous, so as to cause the server to correct the map data.

5. The method according to claim 1, wherein the method further comprises:
giving alarm information, if the map data is determined to be erroneous.

6. An apparatus for detecting map error information, the apparatus being disposed in a vehicle and comprising:
at least one processor and a memory;
the memory stores a computer program, wherein the computer program stored in the memory when being executed by the at least one processor, causes the at least one processor to:
acquire current environmental feature information around the vehicle, wherein the current environmental feature information comprises at least one of lane line feature information, intersection feature information, lane quantity feature information, and roadside object feature information;
detect, according to the current environmental feature information and map data, whether the map data is erroneous;
determine whether a map data error affects traveling of the vehicle if the map data is determined to be erroneous, and correspondingly control a traveling state of the vehicle if the map data error affects the traveling of the vehicle;
wherein the computer program further causes the processor to:
acquire lane confidence levels of various lanes of a current road according to the current environmental feature information and the map data, wherein a lane confidence level of each lane represents a degree of consistency between detected position information of the lane and position formation of the lane in the map data;
determine, from the lanes of the current road, a lane having a highest lane confidence level as a target lane; and
control the vehicle to continue traveling along the target lane at a speed corresponding to the lane confidence level of the target lane,
wherein different speeds are set for different lane confidence levels.

7. The apparatus according to claim 6, wherein the computer program further causes the processor to:
acquire, from a plurality of sensors on the vehicle, detection information of the sensors;
acquire the current environmental feature information according to the detection information of the sensors.

8. The apparatus according to claim 6, wherein the computer program further causes the processor to:
detect a consistency between a road ahead and the map data in real-time;
control the vehicle to resume a normal traveling state, after it is detected that the road ahead is consistent with the map data.

9. The apparatus according to claim 6, wherein the computer program further causes the processor to:
report error information to a server if the map data is determined to be erroneous, so as to causes the server to correct the map data.

10. The apparatus according to claim 6, wherein the computer program further causes the processor to:
give alarm information, if the map data is determined to be erroneous.

11. A vehicle, comprising: at least one sensor, and an apparatus for detecting map error information, the apparatus comprising:
at least one processor and a memory;
the memory stores a computer program, wherein the computer program stored in the memory when being executed by the at least one processor, causes the at least one processor to:
acquire, from the at least one sensor, current environmental feature information around the vehicle, wherein the current environmental feature information comprises at least one of lane line feature information, intersection feature information, lane quantity feature information, and roadside object feature information;
detect, according to the current environmental feature information and map data, whether the map data is erroneous;
determine whether a map data error affects traveling of the vehicle if the map data is determined to be erroneous, and correspondingly control a traveling state of the vehicle if the map data error affects the traveling of the vehicle;

wherein the computer program further causes the processor to:

acquire lane confidence levels of various lanes of a current road, according to the current environmental feature information and the map data, wherein a lane confidence level of each lane represents a degree of consistency between detected position information of the lane and position formation of the lane in the map data;

determine, from the lanes of the current road, a lane having a highest lane confidence level as a target lane; and control the vehicle to continue traveling along the target lane at a speed corresponding to the lane confidence level of the target lane, wherein different speeds are set for different lane confidence levels.

12. The method according to claim 1, wherein the method further comprises:

giving alarm information only in a situation where the map data error causes risk for the traveling of the vehicle, not giving the alarm information and not controlling the traveling state of the vehicle in a situation where there is one additional object on the roadside that does not affect the traveling of the vehicle.

13. The apparatus according to claim 6, wherein the computer program further causes the processor to:

give alarm information only in a situation where the map data error causes risk for the traveling of the vehicle, not give the alarm information and not control the traveling state of the vehicle in a situation where there is one additional object on the roadside that does not affect the traveling of the vehicle.

14. The method according to claim 1, wherein the lane feature information comprises lane line position information, and a quantity of lane lines at different positions of a road ahead; the intersection feature information comprises intersection position information, what kind of intersection it is, what buildings are there in an impassable direction of an intersection, and traffic light information at the intersection; the lane quantity feature information comprises a quantity of lanes corresponding to an impassable position ahead; and the roadside object feature information comprises building, a sign, a telegraph pole appearing at roadside.

15. The apparatus according to claim 6, wherein the lane feature information comprises lane line position information, and a quantity of lane lines at different positions of a road ahead; the intersection feature information comprises intersection position information, what kind of intersection it is, what buildings are there in an impassable direction of an intersection, and traffic light information at the intersection; the lane quantity feature information comprises a quantity of lanes corresponding to an impassable position ahead; and the roadside object feature information comprises building, a sign, a telegraph pole appearing at roadside.

16. The device according to claim 11, wherein the lane feature information comprises lane line position information, and a quantity of lane lines at different positions of a road ahead; the intersection feature information comprises intersection position information, what kind of intersection it is, what buildings are there in an impassable direction of an intersection, and traffic light information at the intersection; the lane quantity feature information comprises a quantity of lanes corresponding to an impassable position ahead; and the roadside object feature information comprises building, a sign, a telegraph pole appearing at roadside.

* * * * *